(12) United States Patent
Chen

(10) Patent No.: US 7,787,491 B2
(45) Date of Patent: Aug. 31, 2010

(54) METHOD AND SYSTEM FOR SYNCHRONIZABLE E-VSB ENHANCED DATA INTERLEAVING AND DATA EXPANSION

(75) Inventor: Wu-Hsiang Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1041 days.

(21) Appl. No.: 11/510,331

(22) Filed: Aug. 25, 2006

(65) Prior Publication Data

US 2008/0063089 A1 Mar. 13, 2008

(51) Int. Cl.
*H04J 3/16* (2006.01)
*H04J 3/22* (2006.01)

(52) U.S. Cl. ..................................... 370/466
(58) Field of Classification Search ................ 370/466, 370/395, 465, 473–475, 376, 358, 301, 350, 370/535, 324, 512, 527, 204, 486, 487; 375/240, 375/301, 321, 341, 270; 714/776, 748, 746; 709/231; 379/93; 341/61; 710/311; 348/423, 348/731, 468
See application file for complete search history.

(56) References Cited

U.S. PATENT DOCUMENTS

| | | | |
|---|---|---|---|
| 6,633,566 B1* | 10/2003 | Pierson, Jr. | 370/395.1 |
| 6,710,725 B1* | 3/2004 | Soques | 341/61 |
| 7,092,447 B2* | 8/2006 | Choi et al. | 375/240.25 |
| 7,599,348 B2* | 10/2009 | Kang et al. | 370/350 |
| 2003/0204636 A1* | 10/2003 | Greenblat et al. | 709/251 |
| 2005/0031097 A1* | 2/2005 | Rabenko et al. | 379/93.31 |
| 2005/0111586 A1* | 5/2005 | Kang et al. | 375/321 |
| 2006/0104391 A1* | 5/2006 | Choi et al. | 375/341 |
| 2006/0126757 A1* | 6/2006 | Choi et al. | 375/301 |
| 2006/0140224 A1* | 6/2006 | Yoshida et al. | 370/535 |
| 2006/0140301 A1* | 6/2006 | Choi et al. | 375/270 |
| 2006/0195752 A1* | 8/2006 | Walker et al. | 714/748 |
| 2006/0259843 A1* | 11/2006 | Welborn et al. | 714/746 |
| 2007/0237263 A1* | 10/2007 | Strolle et al. | 375/321 |
| 2009/0037794 A1* | 2/2009 | Choi et al. | 714/776 |
| 2009/0055569 A1* | 2/2009 | Maheshwari et al. | 710/311 |

* cited by examiner

*Primary Examiner*—Pankaj Kumar
*Assistant Examiner*—Prenell P Jones
(74) *Attorney, Agent, or Firm*—McAndrews, Held & Malloy, Ltd.

(57) ABSTRACT

Methods and systems for a synchronizable E-VSB enhanced data interleaving and data expansion are disclosed. Aspects of one method may include a packet processor that may generate valid output when a portion of the packet processor may initially contain invalid data. The packet processor may generate the valid data after detecting that storage elements within an interleaver integrated within the packet processor may be filled with valid data received from input, and that a byte output by the interleaver may be a first byte among the bytes in the interleaver that may be part of a new VBS field.

28 Claims, 8 Drawing Sheets

METHOD AND SYSTEM FOR SYNCHRONIZABLE E-VSB ENHANCED DATA INTERLEAVING AND DATA EXPANSION

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing data. More specifically, certain embodiments of the invention relate to a method and system for synchronizable E-VSB enhanced data interleaving and data expansion.

BACKGROUND OF THE INVENTION

National Television Systems Committee (NTSC) was created in 1940 to provide a standardized format for television broadcast in the United States. The NTSC approved a 525 lines-per-field, 60 interlaced fields per second, with 4-3 aspect ratio using a 6-MHz bandwidth allocated per channel for transmission. The sound was frequency modulated and each channel was broadcast using vestigial sideband technique. In 1950, the committee was reconstituted to provide a standardized format for color television in the United States. The NTSC updated the earlier television standard to make it fully backwards compatible with the black-and-white television broadcasts.

In 1982, the Advanced Television Systems Committee (ATSC) was established to set broadcasting standards for digital television (DTV) broadcasting for the United States. The ATSC standard uses the same 6 MHz bandwidth allocated per channel for NTSC analog broadcasts. However, a television station can broadcast a plurality of different image sizes including a high-definition (HD) television program in 16×9 aspect ratio, a HD program in standard 4×3 aspect ratio, or standard definition (SD) program of the NTSC standard. Since a HD program in 16×9 aspect ratio has more than six times the pixel resolution of a SD program, a broadcasting station can mix the types of programs it will broadcast simultaneously in its allocated 6 MHz bandwidth. For example, a single HD program in 16×9 aspect ratio can be broadcast, or up to six SD programs can be broadcast simultaneously.

To transmit data more efficiently, ATSC chose the eight level vestigial sideband (8-VSB) modulation technique for broadcasting. ATSC uses MPEG-2 compression system to encapsulate data into 188-byte packets for transmission. However, 8-VSB's shortcoming is that it cannot be adapted to changes in radio propagation conditions, as might be found for mobile receivers. In order to take this into account, ATSC has since improved the transmission standard with addition of the optional, more robust transmission capability called the enhanced 8-VSB (E-VSB). E-VSB, while backwards compatible with the original 8-VSB, comprises an added layer of forward error correction to improve accuracy of received signals. While E-VSB enhances transmission and reception of HD television (HDTV) signals, there may still be problems in detailed implementations relating to powering-up or initialization of the E-VSB transmitter as well as synchronization of the E-VSB receiver to the transmitted data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for synchronizable E-VSB enhanced data interleaving and data expansion, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for synchronizable E-VSB enhanced data interleaving and data expansion. Aspects of the method may comprise a packet processor that may generate valid output data when a portion of the packet processor may contain invalid data. The packet processor may generate the valid output data after detecting various events. One event may occur when storage elements within an interleaver integrated within the packet processor may be filled with valid input data in the second format. Another event may occur when a byte communicated to the data expander by the interleaver may be a first byte in the second format for a new VBS field. The packet processor may process packet data that may be in a plurality of formats. For example, one format may be main rate where the data may not need to be expanded by a data expander integrated within the packet processor. Other formats may be ½ rate where each byte of the data may be expanded to two bytes and/or ¼ rate where each byte of the data may be expanded to four bytes. Other formats with different rates may also be used.

The interleaver may count the number of valid bytes received to detect when the storage elements within the interleaver may be filled with the valid data. When the count of valid bytes reaches a pre-determined value such that a byte communicated to the data expander by the interleaver is a first byte in the second format for a new VBS field, the interleaver may assert an interleaver valid signal. The interleaver may also generate an asserted interleaver valid signal that may indicate that an output of the interleaver may be valid if the interleaver detects that it has received a valid first byte of the enhanced packet data. If the interleaver valid signal is deasserted, the data expander may discard data received from the interleaver. When the data expander receives valid data from the interleaver, it may indicate that its output may be valid by asserting an expander valid signal.

Figure 1:
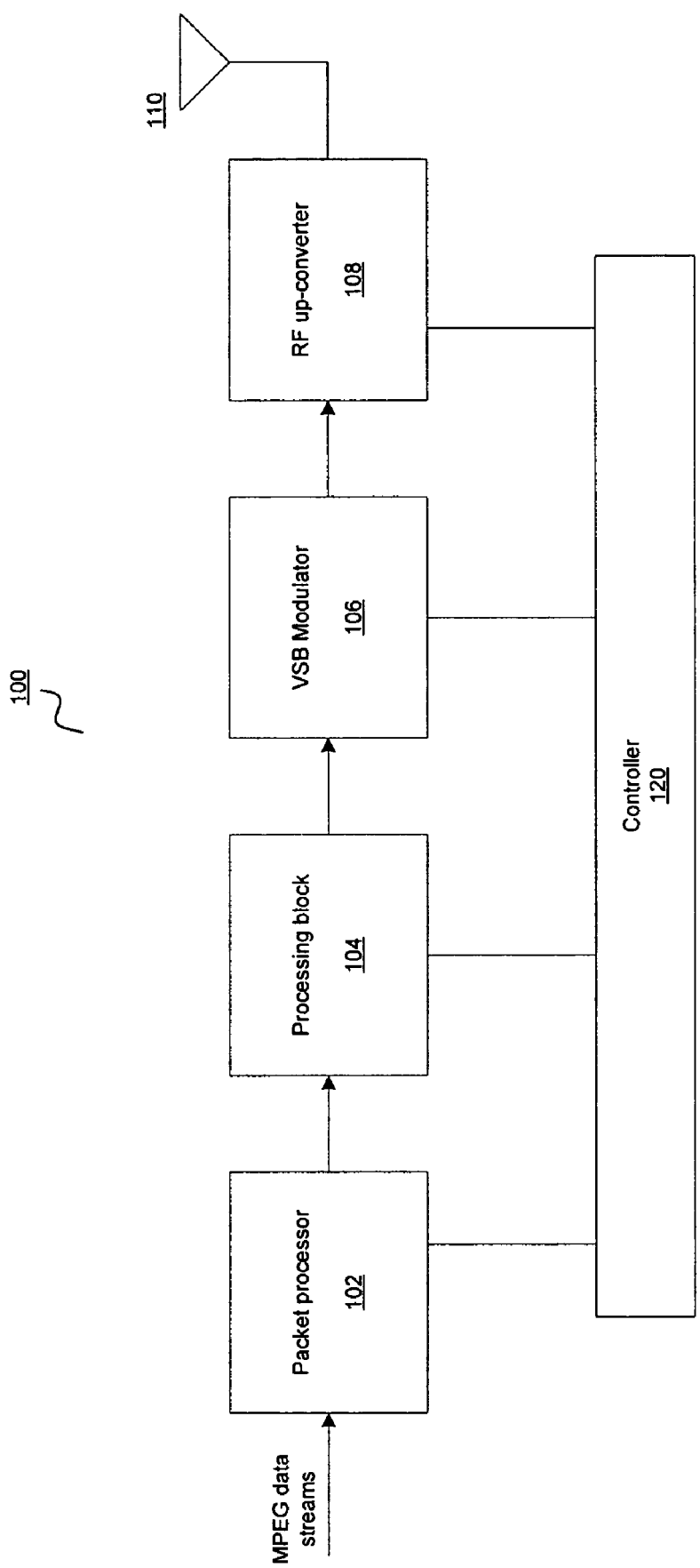
FIG. 1 is a block diagram of an exemplary transmit path for transmitting main and enhanced VSB data, which may be utilized in connection with an embodiment of the invention.

FIG. 1 is a block diagram of an exemplary transmit path for transmitting main and enhanced VSB data, which may be utilized in connection with an embodiment of the invention. Referring to FIG. 1, there is shown an E-VSB transmit system 100. The E-VSB transmit system 100 may comprise a main and enhanced multiplexer packet processor 102, processing block 104, a VSB modulator 106, a RF up-converter 108, a transmit antenna 110, and a controller block 120.

The main and enhanced multiplexer packet processor 102 may comprise suitable logic, circuitry, and/or code that may enable processing of main and enhanced data to generate enhanced MPEG data. The enhanced MPEG data may comprise main data, or main rate data, interleaved with enhanced data. The processing block 104 may comprise suitable logic, circuitry, and/or code that may enable further processing of the data in the MPEG data from the main and enhanced multiplexer packet processor 102. The processing block 104 may, for example, generate a pilot signal and field synchronization signals, and pre-equalize the data.

The VSB modulator 106 may comprise suitable logic, circuitry, and/or code that may enable modulation of the data using VSB techniques, which may be similar to single sideband modulation technique. Accordingly, the VSB technique may remove most of, for example, a lower sideband to increase transmission power efficiency. The resulting VSB modulated signal may be, for example, at an intermediate frequency of 44 MHz.

The RF up-converter 108 may comprise suitable logic, circuitry, and/or code that may enable appropriate filtering, amplifying, and up-conversion of the VSB modulated signal to the desired channel frequency. For example, if a desired transmit frequency is 54 MHz, which may be identified as channel 2 for television broadcasts, the RF up-converter may up-convert the 44 MHz IF signal to the 54 MHz RF signal. The RF signal may be communicated to the antenna 110 for transmission.

The controller block 120 may comprise suitable logic, circuitry, and/or code that may enable controlling and/or monitoring of various portions of the transmit path, for example, the main and enhanced multiplexer packet processor 102, the processing block 104, the VSB modulator 106, and/or the RF up-converter 108. For example, the controller block 120 may provide control signals that controls, for example, the generation of enhanced MPEG data by the main and enhanced multiplexer packet processor 102, and multiplexing of enhanced data and un-enhanced (main) data by the main and enhanced multiplexer packet processor 102.

In operation, MPEG packets may be received by the main and enhanced multiplexer packet processor 102 via three streams. A first stream may comprise main data that may not need enhanced forward error correction (FEC), a second stream may comprise ½ rate data that may need enhanced FEC, and a third stream may comprise ¼ rate data that may also need enhanced FEC. The enhanced FEC may, for example, double the number of bytes in the ½ rate data and quadruple the number of bytes in the ¼ rate data with the addition of error detection and correction parity bytes. The main and enhanced multiplexer packet processor 102 may multiplex, as needed, the main data, the ½ rate data with FEC, and/or the ¼ rate data with FEC to form a single stream of data. The output of the main and enhanced multiplexer packet processor 102 may be referred to as enhanced MPEG data.

The enhanced MPEG data may be communicated to the processing block 104 where further processing may occur. For example, the data may be randomized, encoded based on Reed-Solomon encoding algorithm for forward error correction, and convolution coded for data block error protection. Pilot, segment and field synchronization signals may also be generated and multiplexed into the stream of enhanced MPEG data. The processed enhanced MPEG data may be communicated to the VSB modulator 106, which may modulate the processed enhanced MPEG data to generate the IF signal. The IF signal may be amplified and up-converted to the RF signal by the RF up-converter 108, and the resulting RF signal may be transmitted by the antenna 110.

Figure 2:
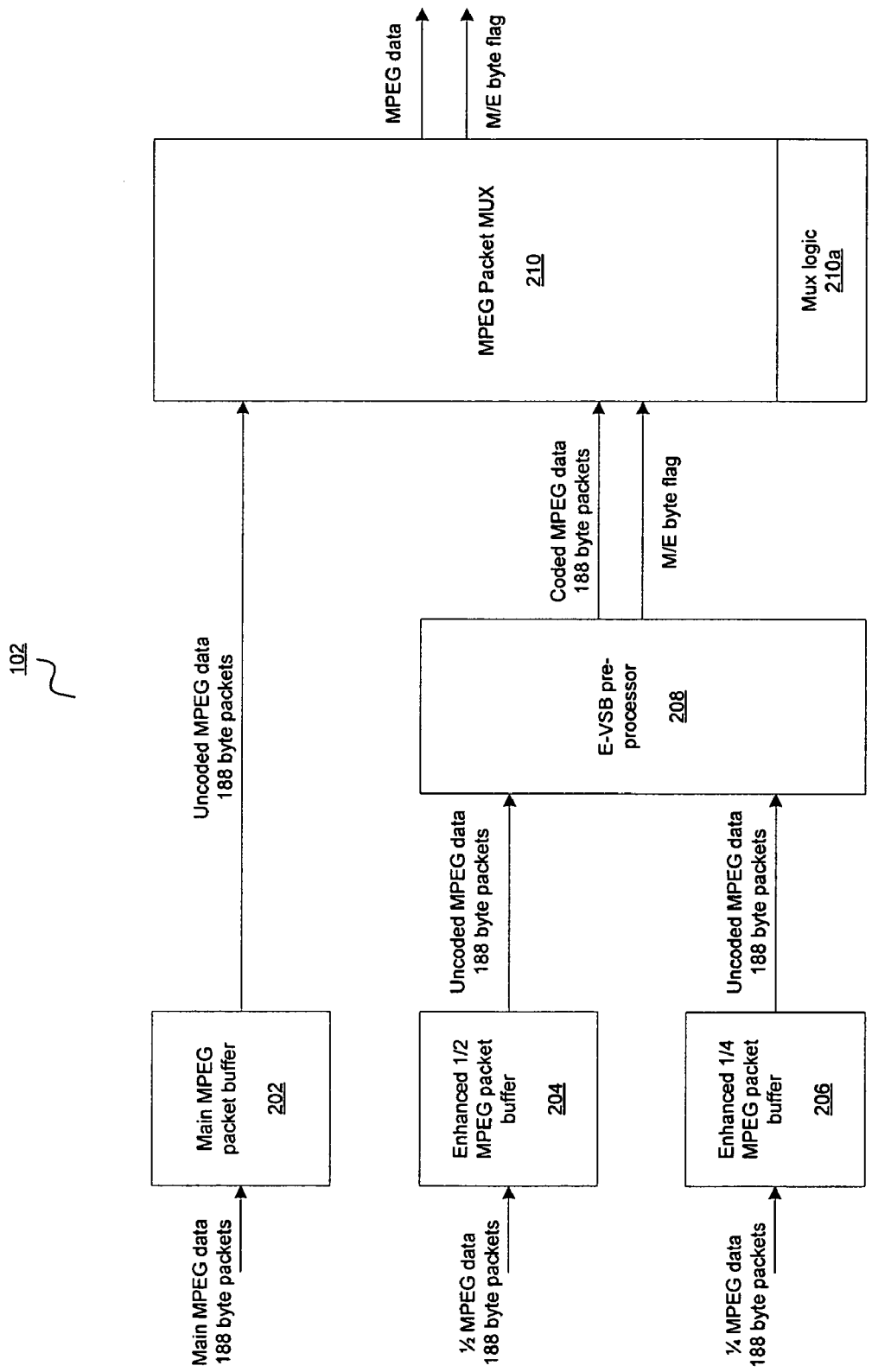
FIG. 2 is a block diagram of an exemplary main and enhanced multiplexer packet preprocessor, which may be utilized in connection with an embodiment of the invention.

FIG. 2 is a block diagram of an exemplary main and enhanced multiplexer packet preprocessor, which may be utilized in connection with an embodiment of the invention. Referring to FIG. 2, there is shown the main and enhanced multiplexer packet preprocessor 102. The main and enhanced multiplexer packet preprocessor 102 may comprise a main MPEG packet buffer 202, an enhanced ½ MPEG packet buffer 204, an enhanced ¼ MPEG packet buffer 206, an E-VSB pre-processor 208, and a MPEG packet multiplexer 210.

The main MPEG packet buffer 202 may comprise suitable logic, circuitry, and/or code that may enable receiving and storing of main data where, for example, the input may be 188-byte packets and output may be 188-byte packets. The main MPEG data may comprise a portion of original data that may not be processed to have enhanced FEC. The enhanced ½ MPEG packet buffer 204 may comprise suitable logic, circuitry, and/or code that may enable receiving and storing of data that may be processed for ½ rate FEC. The enhanced ¼ MPEG packet buffer 206 may comprise suitable logic, circuitry, and/or code that may enable receiving and storing of data that may be processed for ¼ rate FEC. The enhanced ½ MPEG packet buffer 204 and the enhanced ¼ MPEG packet buffer 206 may also receive and output, for example, 188-byte MPEG packets.

The E-VSB pre-processor 208 may comprise suitable logic, circuitry, and/or code that may enable processing, for example, the data packets from the enhanced ½ MPEG packet buffer 204 and the enhanced ¼ MPEG packet buffer 206. The processing may comprise, for example, multiplexing of the two streams of data from the enhanced ½ MPEG packet buffer 204 and the enhanced ¼ MPEG packet buffer 206 to a single stream of enhanced data. The single stream of enhanced data may be further processed with FEC code to generate parity bytes, and the resulting data may be interleaved to reduce the likelihood that a burst error may corrupt sequential bytes. The E-VSB pre-processor 208 may receive and output, for example, 188-byte packets. The output of the E-VSB pre-processor 208 may be a byte at a time. A Main/Enhanced (M/E) flag may be output with each byte of the packet output, where the flag may be indicate a Main state when the four bytes of MPEG-2 header are output and indicate an Enhanced state when the 184 bytes of payload are output.

The MPEG packet multiplexer 210 may comprise suitable logic, circuitry, and/or code that may enable interleaving the stream of main data from the main MPEG packet buffer 202 and the single stream of enhanced MPEG data from the E-VSB pre-processor 208. The single stream output of the MPEG packet multiplexer 210 may comprise MPEG packets and a flag for each byte of the MPEG packets that may indicate whether an output byte is main data or enhanced data. The specific pattern in which the data may be multiplexed by the MPEG packet multiplexer 210 may be indicated by a controller, such as, for example, the controller 120, or a processor (not shown) to the MPEG packet multiplexer 210. For example, an E-VSB map may be written to the multiplexer logic block 210a, where the E-VSB map may indicate the order and/or mix ratio of bytes for the main data, the ½ rate data, and/or the ¼ rate data. Accordingly, the multiplexer logic block 210a may appropriately output bytes from the main data, the ½ rate data, and/or the ¼ rate data.

In operation, main data corresponding to a VSB field may be received by the main MPEG packet buffer 202 in 188-byte packets. The VSB field is described with respect to FIG. 4. The enhanced ½ MPEG packet buffer 204 and the enhanced ¼ MPEG packet buffer 206 may receive enhanced data in 188-byte packets for the VSB field that may correspond to the main data received by the main MPEG packet buffer 202. The enhanced ½ MPEG packet buffer 204 and the enhanced ¼ MPEG packet buffer 206 may store the received data, and output the received data as 188-byte packets, which may be communicated to the E-VSB pre-processor 208. The E-VSB pre-processor 208 may process the 188-byte packets from the enhanced ½ MPEG packet buffer 204 and the enhanced ¼ MPEG packet buffer 206 to generate a single stream of data that may have been processed with FEC code. The 188-byte packets from the E-VSB pre-processor 208 may be communicated to the MPEG packet multiplexer 210.

The MPEG packet multiplexer 210 may multiplex the enhanced data from the E-VSB pre-processor 208 with the main data from the main MPEG packet buffer 202 to form a single stream of output, where the output may be 188-byte MPEG packets. The MPEG packet multiplexer 210 may also output a M/E byte flag for each byte of the 188-byte MPEG packets output. The M/E byte flag may be in the Main state for the data from the main MPEG packet buffer 202 and for the four bytes of MPEG-2 header for each enhanced packet from the E-VSB pre-processor 208, and in the Enhanced state when bytes corresponding to the 184 bytes of the enhanced data payload from the E-VSB pre-processor 208 are output.

Figure 3:
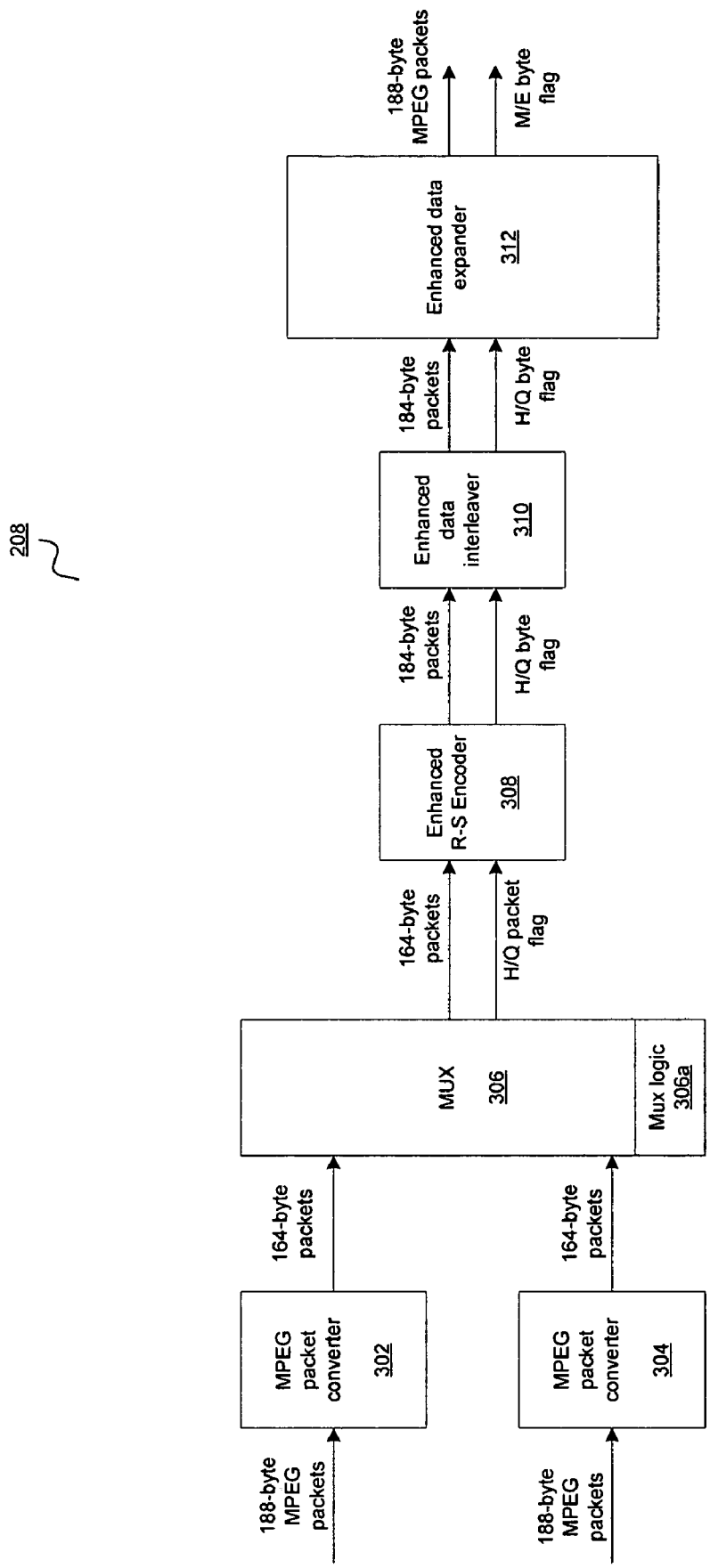
FIG. 3 is a block diagram of an exemplary E-VSB preprocessor, which may be utilized in connection with an embodiment of the invention.

FIG. 3 is a block diagram of an exemplary E-VSB pre-processor, which may be utilized in connection with an embodiment of the invention. Referring to FIG. 3, there is shown the E-VSB pre-processor 208, which may comprise MPEG packet converters 302 and 304, an enhanced data multiplexer 306, an enhanced Reed-Solomon encoder 308, an enhanced data interleaver 310, and an enhanced data expander 312.

The MPEG packet converters 302 and 304 may comprise suitable logic, circuitry, and/or code that may enable receiving 188 byte packets and outputting 164 byte packets. The MPEG packet converters 302 and 304 may handle, for example, ½ rate data and ¼ rate data, respectively. The enhanced data multiplexer 306 may comprise suitable logic, circuitry, and/or code that may enable receiving two streams of 164-byte packets and multiplexing the two streams to output a single stream of 164-byte packets. The method of multiplexing may be indicated by, for example, the controller 120 or a processor (not shown) to, for example, the multiplexer logic block 306a. For example, E-VSB map may be written to the multiplexer logic block 306a, where the E-VSB map may indicate the order and/or mix ratio of the ½ rate data and/or the ¼ rate data packets that may be in a packet output by the enhanced data multiplexer 306. Accordingly, the multiplexer logic block 306a may appropriately output the ½ rate data and/or the ¼ rate data packets from the MPEG packet converters 302 and 304, respectively.

The enhanced data multiplexer 306 may also output a Half/Quarter (H/Q) segment flag for each packet of the 164-byte packets that may indicate whether an output packet is ½ rate data or ¼ rate data. For example, the H/Q flag may indicate a Half state when the packet output is from the MPEG packet converter 302, and a Quarter state when the packet output is from the MPEG packet converter 304.

The enhanced Reed-Solomon encoder 308 may comprise suitable logic, circuitry, and/or code that may enable generation of, for example, 20 parity bytes for FEC for each 164-byte packet from the enhanced data multiplexer 306. The enhanced Reed-Solomon encoder 308 may also output a H/Q flag that may correspond to the H/Q flag from the enhanced data multiplexer 306. The generated parity bytes for a packet may have the same H/Q state as the packet for which it was generated. However, the H/Q flag generated by the enhanced Reed-Solomon encoder 308 may be on a byte basis, rather than a packet basis. The enhanced Reed-Solomon encoder 308 may output an 184-byte packet for each 164-byte packet received, where 20 parity bytes may be generated.

The enhanced data interleaver 310 may comprise suitable logic, circuitry, and/or code that may enable interleaving data from the enhanced Reed-Solomon encoder 308 to reduce the likelihood that a burst error may corrupt sequential bytes of a packet. Accordingly, after interleaving, sequential bytes of an input packet may be separated in a packet and/or in a plurality of packets. The H/Q flag may be output by the enhanced data interleaver 310 on a byte basis.

The enhanced data expander 312 may comprise suitable logic, circuitry, and/or code that may enable receiving 184-byte packets from the enhanced data interleaver 310, and expanding each ½ rate data byte to two bytes and each ¼ rate data byte to four bytes. The additional bytes generated may comprise FEC redundancy bytes to better enable a E-VSB receiver (not shown) to generate data transmitted by, for example, the E-VSB transmit system 100. The enhanced data expander 312 may form 184-byte packets, and then append a four-byte MPEG-2 header to each packet to output 188-byte MPEG-2 packets. The enhanced data expander 312 may also output a M/E flag, where the Main state may be indicated for the four header bytes and an Enhanced state may be indicated for the 184 payload bytes.

In operation, the MPEG packet converters 302 and 304 may receive ½ rate packets and ¼ rate packets, respectively, from the enhanced ½ MPEG packet buffer 204 and the enhanced ¼ MPEG packet buffer 206. The MPEG packet converters 302 and 304 may convert the 188-byte packets to 164 byte packets and communicate the 164-byte packets to the enhanced data multiplexer 306. The enhanced data multiplexer 306 may multiplex the packets to the enhanced Reed-Solomon encoder 308, along with the H/Q segment flag.

The enhanced Reed-Solomon encoder 308 may generate 20 bytes of FEC parity for each packet to form 184 byte packets. Each packet may be communicated to the enhanced data interleaver 310 a byte at a time with a corresponding H/Q byte flag. The enhanced data interleaver 310 may interleave the received data to one or more 184-byte packets. The interleaved data along with the corresponding H/Q byte flag may be communicated to the enhanced data expander 312. The enhanced data expander 312 may expand each ½ rate byte to two bytes, where some bits may be the original data and the other bits may be FEC redundancy data. The enhanced data expander 312 may also expand each ¼ rate byte to four bytes, where some bits may be the original data and the other bits may be FEC redundancy data.

The enhanced data expander 312 may form 184-byte packets, and then append a four byte MPEG-2 header to form a 188-byte MPEG-2 packet. The 188-byte MPEG-2 packet may be output by the enhanced data expander 312 along with corresponding M/E byte flag. The M/E byte flag may indicate a Main state for the four header bytes and an Enhanced state for each byte of the 184-byte payload.

Figure 4:
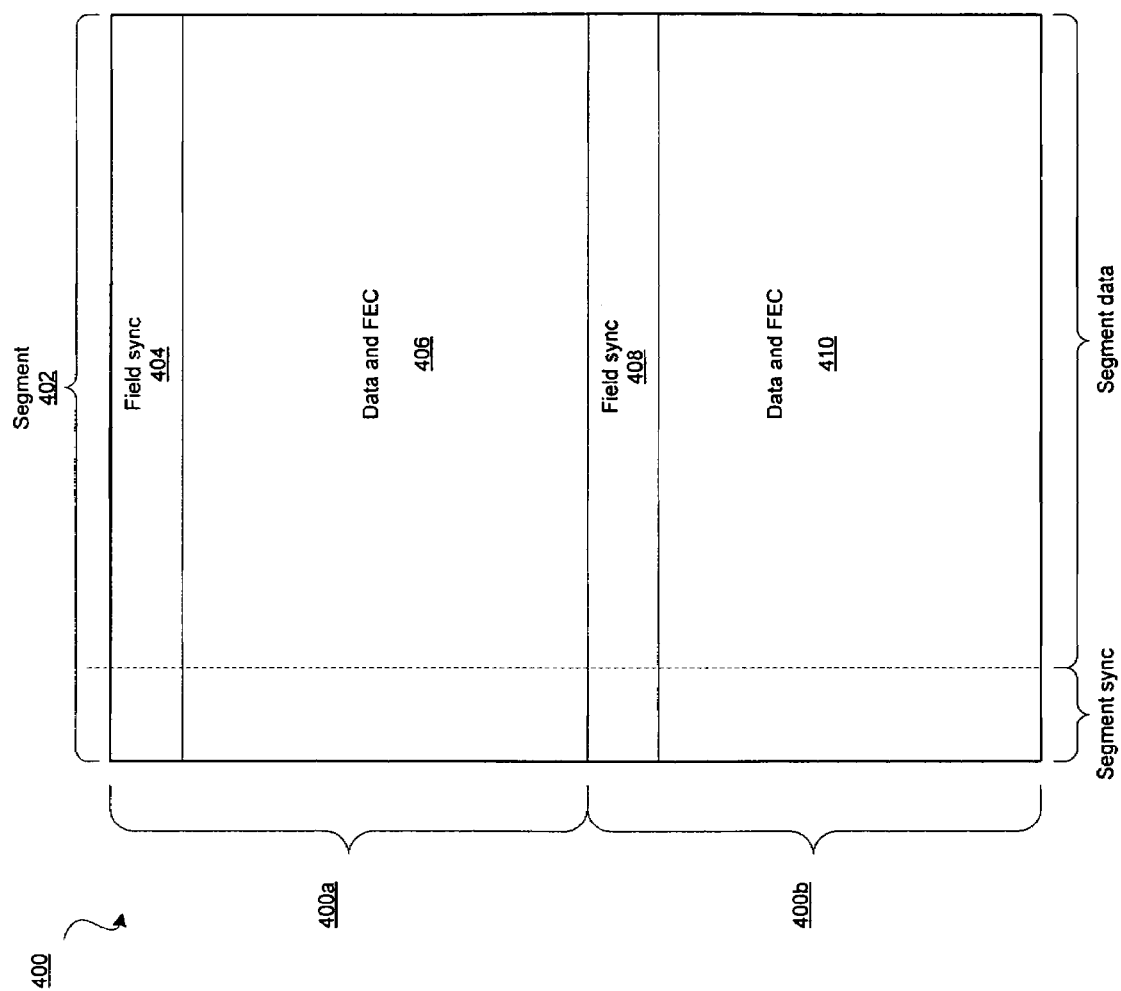
FIG. 4 is an exemplary illustration of a VSB data frame, which may be utilized in connection with an embodiment of the invention.

FIG. 4 is an exemplary illustration of a VSB data frame, which may be utilized in connection with an embodiment of the invention. Referring to FIG. 4, there is shown the VSB data frame 400, which may comprise a first field 400a and a second field 400b. The first field 400a may comprise a first field synchronization signal 404 and a first data section 406, and the second field 400b may comprise a second field synchronization signal 408 and a second data section 410.

The first field synchronization signal 404 and the second field synchronization signal 408 may each comprise, for example, a single segment 402. The first data section 406 and the second data section 410 may each comprise, for example, 312 segments 402. The segment 402 may comprise a segment synchronization signal 402a and a segment data 402b. The segment synchronization signal 402a at the start of each segment 402 may be used by VSB receiver (not shown) receiving the transmitted VSB signal for segment synchronization. Each segment 402 comprises the amount of data that may be equivalent to a 188-byte MPEG packet at the MPEG packet multiplexer 210 output.

Figure 5:
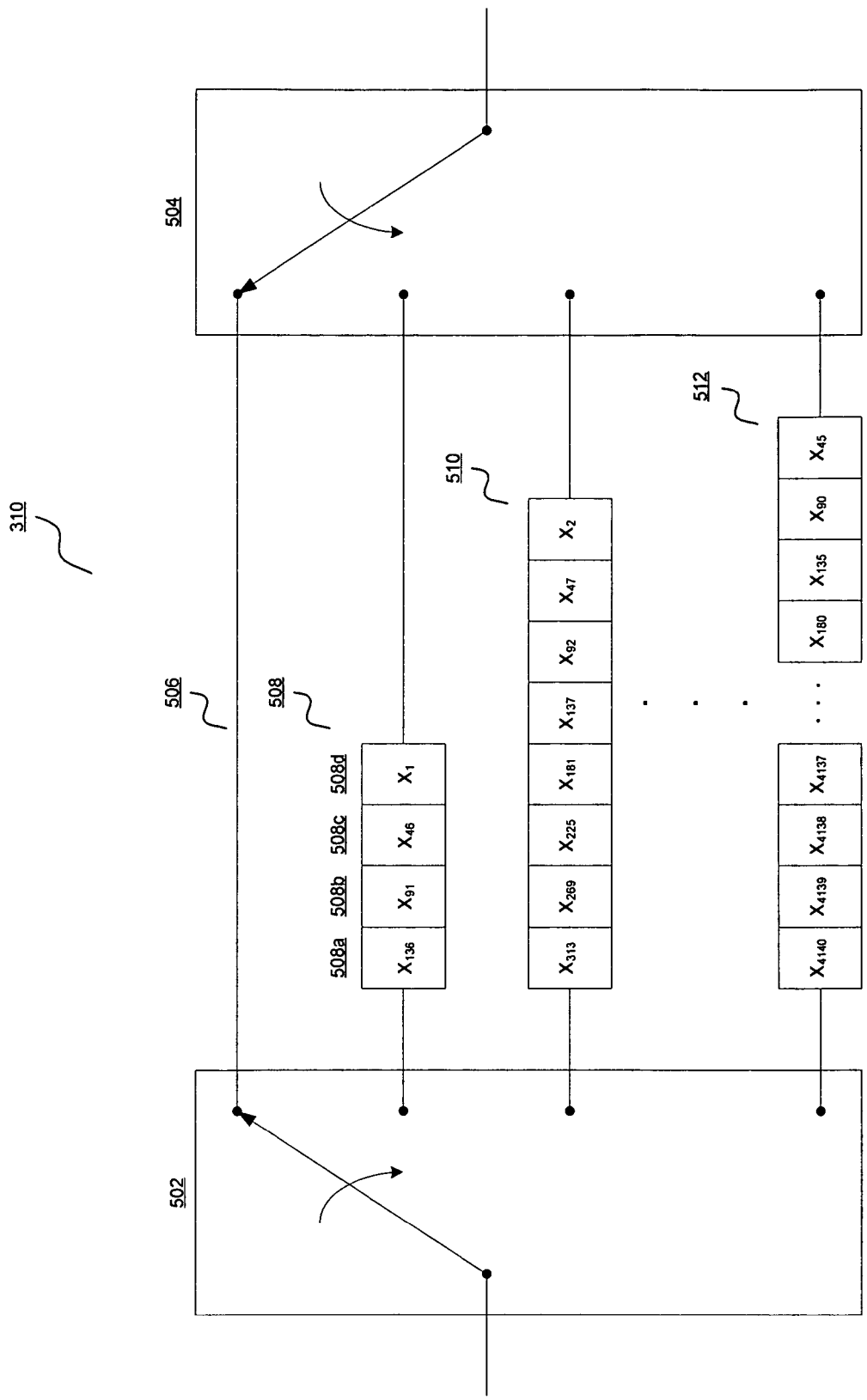
FIG. 5 is an exemplary illustration of enhanced data interleaver, which may be utilized in connection with an embodiment of the invention.

FIG. 5 is an exemplary illustration of enhanced data interleaver, in connection with an embodiment of the invention. Referring to FIG. 5, there is shown the enhanced data interleaver 310. The enhanced data interleaver 310 may comprise a demultiplexer 502, a multiplexer 504, a zero-delay connection 506, and shift registers 508, 510, . . . , 512. The demultiplexer 502 may comprise suitable logic, circuitry, and/or code that may enable transferring input data to one of a plurality of outputs, where each of the plurality of outputs may be electrically coupled to the zero delay connection 506, or one of the shift registers 508 . . . 512. The multiplexer 504 may comprise suitable logic, circuitry, and/or code that may enable transfer of one of a plurality of inputs to an output, where each of the plurality of inputs may be electrically coupled to the zero delay connection 506, or one of the shift registers 508 . . . 512. Each shift register 508 . . . 512 may comprise, for example, multiples of four cells where the shift register 510 may comprise 8 cells, and the shift register 512 may comprise (B−1)*4 cells. B may be a number that is one larger than the number of shift registers 508 . . . 512. Each shift register cell may be able to hold a byte of data plus the corresponding H/Q flag for that byte.

In operation, the enhanced data interleaver 310 may interleave data at the input of the demultiplexer 502. Each of the shift registers 508 . . . 512 may be shifted by a clocking signal to provide a fixed delay. The demultiplexer 502 may be synchronized with the multiplexer 504 such that data may be received by the multiplexer 504 from one of the zero delay connection 506, or one of the shift registers 508 . . . 512 as data is being output by the demultiplexer 502 to the same zero delay connection 506, or one of the shift registers 508 . . . 512. For example, at a specific instance in time, the demultiplexer 502 may communicate a byte to the shift register cell 508a. The data in the shift register 508 may be shifted in to the next shift register cell. The data in the shift register cell 508d may be shifted out to the multiplexer 504. Since the shift register 508 may comprise four shift register cells, where each shift register cell may store a byte, a byte communicated to the shift register 508 by the demultiplexer 502 may be delayed by four clock periods before that data is communicated to the multiplexer 504. Similarly, each shift register 508 . . . 512 may delay data by the number of shift register cells in that shift register.0

Figure 6:
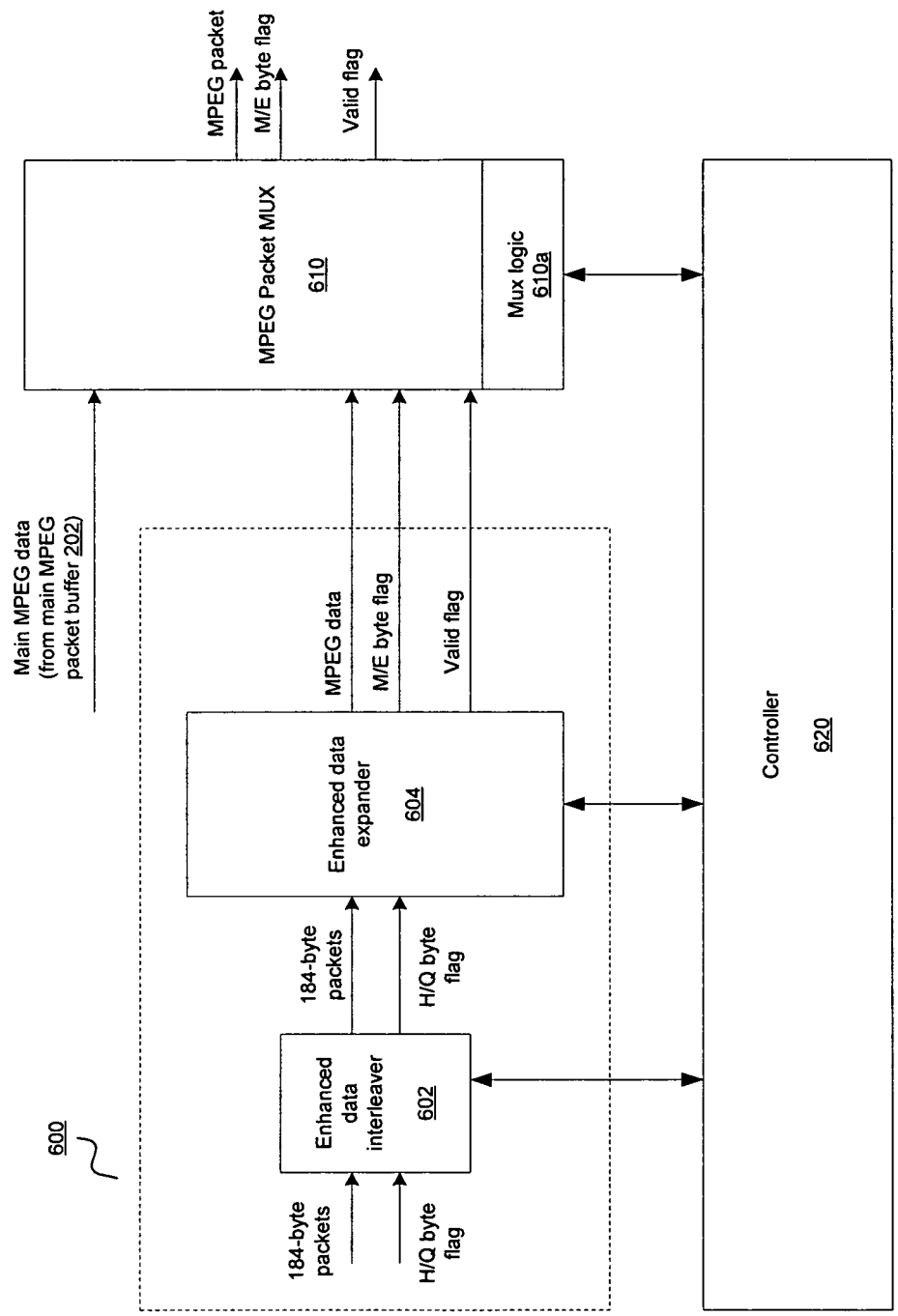
FIG. 6 is an exemplary block diagram that indicates presence of valid data, in accordance with an embodiment of the invention.

When the enhanced data interleaver 310 first powers up, the shift register cells may contain invalid data and/or invalid H/Q flags. Accordingly, the output of the enhanced data interleaver 310 may be invalid until the data and the H/Q flags that may have been present in the shift register cells at power up have been replaced with valid data and valid H/Q flags. For example, the enhanced data interleaver 310 may power up with the unknown data $X_i$ as shown in FIG. 5, and each data $X_i$ may have a corresponding H/Q flag $Y_i$. Exemplary inputs and outputs of the enhanced data interleaver 310 may be illustrated below with valid data inputs $D_i$ and valid H/Q flag inputs:

Input Byte/Flag: $D_1/H, D_2/H, \ldots, D_{184}/H, D_{186}/Q, \ldots, D_{368}/Q, \ldots$ Output Byte/Flag: $D_1/H, X_1/Y_1, X_2/Y_2, \ldots, X_{45}/Y_{45}, D_{47}/H, X_{46}/Y_{46}, \ldots, X_{90}/Y_{90}, D_{93}/H, X_{91}/Y_{91}, \ldots, X_{135}/Y_{135}, D_{139}/H, X_{136}/Y_{136}, \ldots, X_{180}/Y_{180}, D_{185}/Q, D_2, X_{181}/Y_{181}, \ldots$ FIG. 6 is an exemplary block diagram that indicates presence of valid data, in accordance with an embodiment of the invention. Referring to FIG. 6, there is shown an E-VSB pre-processor 600, a MPEG packet multiplexer 610, and a controller block 620. The E-VSB pre-processor may comprise an enhanced data interleaver 602 and an enhanced data expander 604. Conceptually, the E-VSB pre-processor 600 may have some functionalities that may not be present in the E-VSB pre-processor 208. For example, the enhanced data interleaver 602 may comprise circuitry, logic, and/or code that may allow a controller, such as, for example, the controller 620, to count the number of data bytes input to the enhanced data interleaver 602. Accordingly, the controller 620 may then be able to determine when the invalid data in the enhanced data interleaver 602 may have been replaced with valid data.

An additional functionality of the enhanced data expander 604 may comprise suitable logic, circuitry, and/or code that may enable generation of a expander valid flag. The expander valid flag may be deasserted to indicate an invalid state when the enhanced data expander 604 first powers up, or in other instances where the controller 620 may indicate that data from the enhanced data interleaver 602 may not be valid. This may occur, for example, if the enhanced data interleaver 602 needs to be reset. The controller 620 may indicate to the enhanced data expander 604 that data may be expanded. This may occur when the controller 620 determines that the enhanced data interleaver 602 has valid data in, for example, the shift registers 508 . . . 512, and when the controller 620 determines that a first byte that may be used in a field in a VSB frame may be communicated to the enhanced data expander 604. Accordingly, the enhanced data expander 604 may indicate that its output may be valid by asserting the expander valid flag. While the expander valid flag from the enhanced data expander 604 is deasserted, the enhanced data expander 604 may drop data received from the enhanced data interleaver 602.

The MPEG packet multiplexer 610 may comprise circuitry, logic, and/or code that may enable generation of MPEG packets similarly to the MPEG packet multiplexer 210. The MPEG packet multiplexer 610 may also output a multiplexer valid flag that may indicate to another functional block, such as, for example, the processing block 104, whether the MPEG packet multiplexer 610 may be generating valid data. The controller 620 may comprise additional logic, circuitry, and/or code that may enable determining when the enhanced data interleaver may have valid data and when a first byte that may be used in a field in a VSB frame may be communicated to the enhanced data expander 604.

In operation, the enhanced data interleaver 602 may, for example, power up with invalid data in the shift registers 508 . . . 512. The controller 620 may, for example, detect power-up and/or reset to the enhanced data interleaver 602, and may indicate to the enhanced data expander 604 that input data may be invalid. Therefore, the enhanced data expander 604 may deassert the expander valid flag. The controller 620 may, for example, count the number of bytes received by the enhanced data interleaver 602 to determine when the shift registers in the enhanced data interleaver 602 may hold valid data. The controller 620 may then determine when a first byte that may be used in a field for the VSB frame may be communicated to the enhanced data expander 604. After determining that the enhanced data interleaver 602 holds valid data, and that the first byte that may be used in a field for a VSB frame may be communicated to the enhanced data expander 604, the controller 620 may indicate to the enhanced data expander 604 that it may expand data. The enhanced data expander 604 may then proceed to expand the interleaved data from the enhanced data interleaver 602 and assert the expander valid flag.

The asserted expander valid flag may be received by the MPEG packet multiplexer 610 and the MPEG packet multiplexer 610 may assert the multiplexer valid flag as it outputs MPEG packets and corresponding M/E byte flag. The next functional block that may receive the data from the MPEG packet multiplexer 610, for example, the processing block 104, may rely on the multiplexer valid flag to determine whether to use data from the MPEG packet multiplexer 610.

While an embodiment of the invention may have been described with respect to FIG. 6, the invention need not be so limited. For example, various functionalities of the controller 620 may be embedded in other functional blocks. For example, the enhanced data interleaver 602 may count the number of bytes being received and may indicate this to the enhanced data expander 604 via an interleaver valid flag.

In another embodiment of the invention, the enhanced data expander 604 may not discard received data from the enhanced data interleaver 602, but may output data to the MPEG packet multiplexer 610. Accordingly, the MPEG packet multiplexer 610 may output invalid packets. However, when the enhanced data interleaver 602 is outputting valid data, and a first byte that may be used in a field is detected, the controller 620 may perform a soft reset of a portion of the controller 620. The controller 620 may then indicate to the enhanced data expander 604 to start generating data, and to the MPEG packet multiplexer 610 to generate packets using valid data from the enhanced data expander 604. Accordingly, this embodiment of the invention may not need valid flags to be generated by the enhanced data expander 604 and the MPEG packet multiplexer 610.

Figure 7:
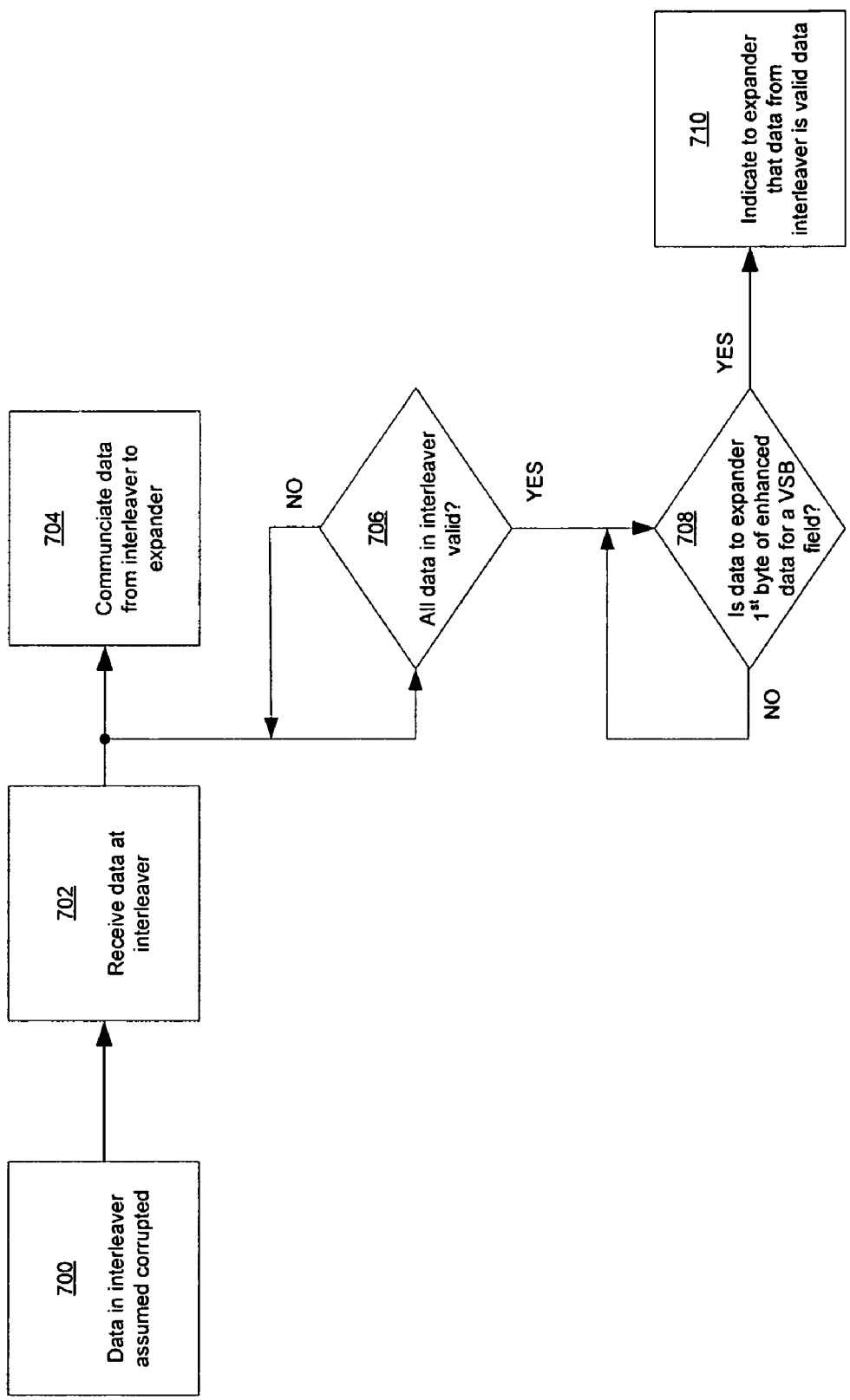
FIG. 7 is a flow diagram illustrating an exemplary routine for starting data expansion with valid data in the enhanced data interleaver, in accordance with an embodiment of the invention.

FIG. 7 is a flow diagram illustrating an exemplary routine for starting data expansion with valid data in the enhanced data interleaver, in accordance with an embodiment of the invention. Referring to FIG. 7, there is shown steps 700 to 710. In step 700, the enhanced data interleaver 602 may power up with invalid data. In step 702, the enhanced data interleaver 602 may receive data from, for example, the enhanced Reed-Solomon encoder 308. The next steps may be step 704 and step 706. In step 704, the enhanced data interleaver 602 may communicate interleaved data to the enhanced data expander 604.

In step 706, the controller 620 may keep count of the number of bytes received by the enhanced data interleaver 602. While the number of bytes received may be less than a number of bytes needed to ensure that data in the enhanced data interleaver 602 may be valid, the next step may be step 706. If the number of bytes received by the enhanced data interleaver 602 is equal to the number of bytes needed to ensure that the data in the enhanced data interleaver 602 may be valid, the next step may be step 708.

In step 708, while the byte communicated to the enhanced data expander 604 is not a first byte that may be used in a new VSB field, the next step may be step 708. While in steps 700 to 708, the enhanced data expander 604 may discard data received from the enhanced data interleaver 602. The enhanced data expander 604 may also deassert the expander valid flag to the MPEG packet multiplexer 610. While the expander valid flag is invalid, the MPEG packet multiplexer 610 may also deassert its multiplexer valid flag. If the byte communicated to the enhanced data expander 604 is a first byte that may be used in a VSB field, the next step may be step 710. In step 710, the controller 620 may indicate to the enhanced data expander 604 that it may start expanding data. The enhanced data expander 604 may assert the expander valid flag to the MPEG packet multiplexer 610. The MPEG packet multiplexer 610 may generate packets and assert its multiplexer valid flag. The processing block 104, for example, may then process the packets from the MPEG packet multiplexer 610.

Figure 8:
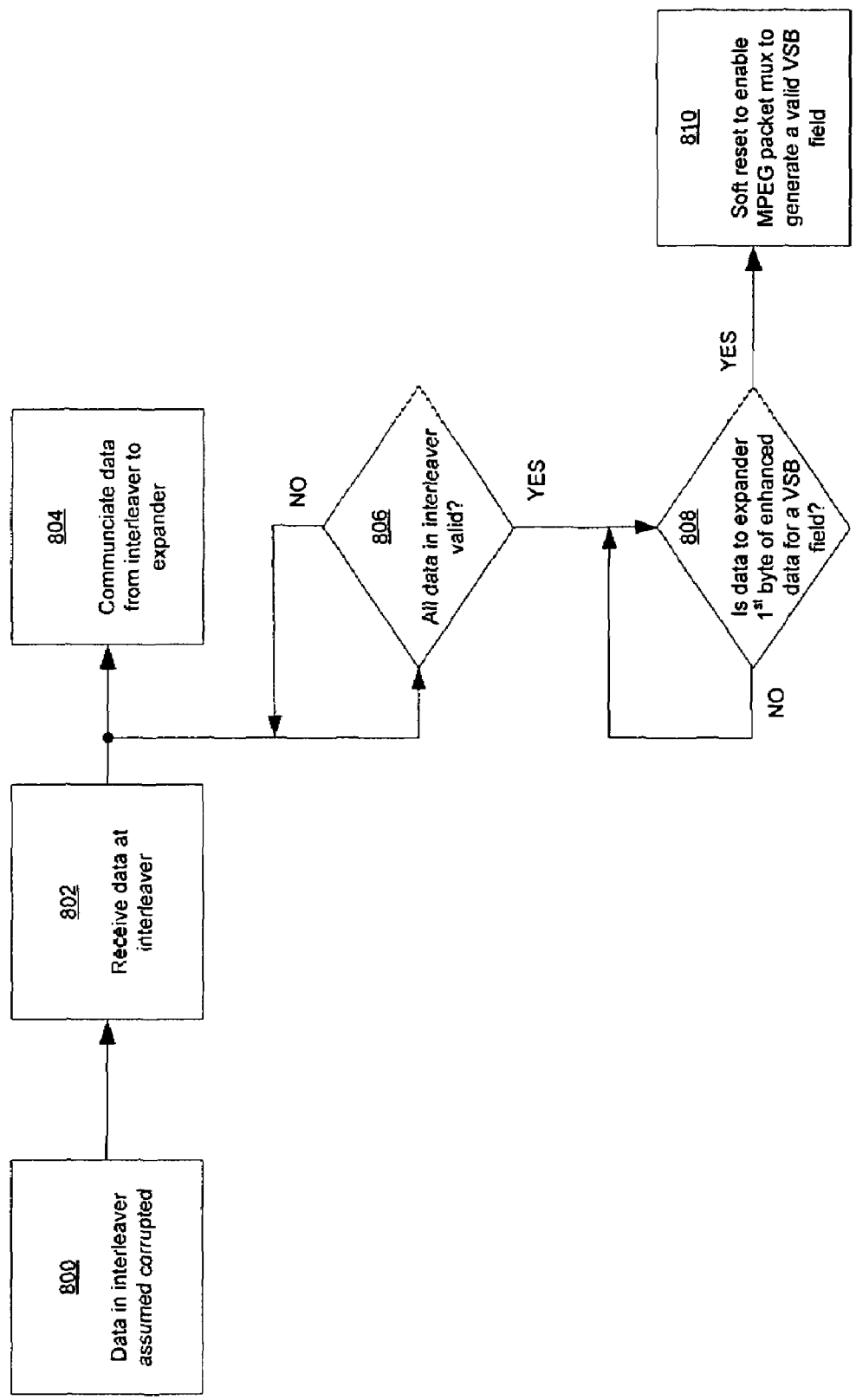
FIG. 8 is a flow diagram illustrating an exemplary routine for starting data expansion with valid data in the enhanced data interleaver, in accordance with an embodiment of the invention.

FIG. 8 is a flow diagram illustrating an exemplary routine for starting data expansion with valid data in the enhanced data interleaver, in accordance with an embodiment of the invention. Referring to FIG. 8, there is shown steps 800 to 810. In step 800, the enhanced data interleaver 602 may power up with invalid data. In step 802, the enhanced data interleaver 602 may receive data from, for example, the enhanced Reed-Solomon encoder 308. The next steps may be step 804 and step 806. In step 804, the enhanced data interleaver 602 may communicate interleaved data to the enhanced data expander 604.

In step 806, the controller 620 may keep count of the number of bytes received by the enhanced data interleaver 602. While the number of bytes received may be less than a number of bytes needed to ensure that data in the enhanced data interleaver 602 may be valid, the next step may be step 806. If the number of bytes received by the enhanced data interleaver 602 is equal to the number of bytes needed to ensure that the data in the enhanced data interleaver 602 may be valid, the next step may be step 808.

In step 808, while the byte communicated to the enhanced data expander 604 is not a first byte that may be used for a VSB field, the next step may be step 808. If the byte communicated to the enhanced data expander 604 is a first byte that may be used for a VSB field, the next step may be step 810. In step 810, the controller 620 may perform a soft reset of a portion of the controller 620. The soft reset may reset a portion of control circuitry in the controller 620 to indicate to the enhanced data expander 604 to start generating data, and to the MPEG packet multiplexer 610 to generate packets using valid data from the enhanced data expander 604 for the next VSB field.

In accordance with an embodiment of the invention, aspects of an exemplary system may comprise a packet processor 102 that may process packet data having a first format and enhanced packet data having a second format. The data having the first format may be the main rate data that may not need to be expanded by, for example, the enhanced data expander 604. The data having the second format may be ½ rate data and/or ¼ rate data. Each byte of a ½ rate data may be expanded to two bytes, and each byte of a ¼ rate data may be expanded to four bytes, by the enhanced data expander 604.

The packet processor 102 may generate valid output data when initially at least a portion of the packet processor 102 comprises invalid data, such as, for example, after powering up the packet processor 102. The valid data may be generated after detecting two events. First, a count may be made of a number of valid bytes received into the shift registers 508 . . . 512 within the enhanced data interleaver 602. Second, when the count reaches a pre-determined value, a first byte of a specified payload field for the enhanced packet data having the second format may be detected as it is communicated to the enhanced data expander 604. The enhanced data interleaver 602 may assert an interleaver valid signal to indicate that its output may be valid. The enhanced data expander 604 may discard data from the enhanced data interleaver 602 while the interleaver valid signal may be deasserted.

For example, the enhanced data expander 604 may assert an expander valid signal to indicate that its output may be valid after receiving the asserted interleaver valid signal from the enhanced data interleaver 602. The MPEG packet multiplexer 610 may assert a packet valid signal when it generates valid output data after receiving the asserted expander valid signal from the enhanced data expander 604. Alternatively, the packet processor 102 may be configured to generate output data on a valid field boundary using valid data from the enhanced data expander 604 by executing a soft reset of at least a portion of the packet processor 102.

Another embodiment of the invention may provide a machine-readable storage, having stored thereon, a computer program having at least one code section executable by a machine, thereby causing the machine to perform the steps as described above for a synchronizable E-VSB enhanced data interleaving and data expansion.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for processing packet data having a first format and enhanced packet data having a second format in a packetized communication system, the method comprising:
   detecting when storage elements within an interleaver integrated within a packet processor are filled with valid packet data having the second format;
   detecting when a first byte of a specified payload field for the enhanced packet data having the second format is received by a data expander integrated within said packet processor; and
   generating, after said detecting, valid output data when at least a portion of said packet processor comprises invalid data.

2. The method according to claim 1, wherein the packet data having the first format comprises main rate data.

3. The method according to claim 1, wherein the packet data having the second format comprises one or both of ½ rate data and ¼ rate data.

4. The method according to claim 1, comprising counting a number of valid bytes received by said interleaver for said detecting when said storage elements within said interleaver are filled with valid data.

5. The method according to claim 4, comprising generating an asserted interleaver valid signal that indicates that output of said interleaver is valid when said counting reaches a pre-determined value.

6. The method according to claim 5, comprising discarding input received by said data expander when said interleaver valid signal is deasserted.

7. The method according to claim 5, comprising generating an asserted expander valid signal that indicates that output of said data expander is valid after said data expander receives said asserted interleaver valid signal.

8. The method according to claim 7, comprising generating an asserted packet valid signal after said generation of said asserted expander valid signal when said packet processor generates said valid output data.

9. The method according to claim 1, comprising generating an asserted interleaver valid signal that indicates that output of said interleaver is valid when said detecting of said first byte of said specified payload field for the enhanced packet data having the second format is received.

10. The method according to claim 9, comprising discarding input received by said data expander when said interleaver valid signal is deasserted.

11. The method according to claim 9, comprising generating an asserted expander valid signal that indicates that output of said data expander is valid after said data expander receives said asserted interleaver valid signal.

12. The method according to claim 11, comprising generating an asserted packet valid signal after said generation of said asserted expander valid signal when said packet processor generates said valid output data.

13. The method according to claim 1, comprising configuring said packet processor to generate said valid output data on a valid field boundary using valid data from said data expander.

14. The method according to claim 13, wherein said configuring occurs via a soft reset of at least a portion of said packet processor.

15. A system for processing packet data having a first format and enhanced packet data having a second format in a packetized communication system, the system comprising:
- a packet processor that enables detecting when storage elements within an interleaver integrated within said packet processor are filled with valid packet data having the second format;
- said packet processor enables detecting when a first byte of a specified payload field for the enhanced packet data having the second format is received by a data expander integrated within said packet processor; and
- said packet processor enables generating, after said detecting, valid output data when at least a portion of said packet processor comprises invalid data.

16. The system according to claim 15, wherein the packet data having the first format comprises main rate data.

17. The system according to claim 15, wherein the packet data having the second format comprises one or both of ½ rate data and ¼ rate data.

18. The system according to claim 15, wherein said storage elements within said interleaver are determined to be filled with valid data by counting a number of valid bytes received by said interleaver.

19. The system according to claim 18, wherein said interleaver enables generation of an asserted interleaver valid signal that indicates that output of said interleaver is valid when said counting reaches a pre-determined value.

20. The system according to claim 19, wherein said data expander enables discarding of received input when said data expander receives a deasserted said interleaver valid signal.

21. The system according to claim 19, wherein said data expander enables generation of an asserted expander valid signal, after said data expander receives said asserted interleaver valid signal, which indicates that output of said data expander is valid.

22. The system according to claim 21, comprising a packet multiplexer integrated within said packet processor that enables generation of an asserted packet valid signal when said packet multiplexer generates said valid output data after said packet multiplexer receives said asserted expander valid signal.

23. The system according to claim 15, wherein said interleaver enables generation of an asserted interleaver valid signal that indicates that output of said interleaver is valid when said detecting of said first byte of said specified payload field for the enhanced packet data having the second format is received.

24. The system according to claim 23, wherein said data expander enables discarding of received input when said data expander receives a deasserted said interleaver valid signal.

25. The system according to claim 23, wherein said data expander enables generation of an asserted expander valid signal, after said data expander receives said asserted interleaver valid signal, which indicates that output of said data expander is valid.

26. The system according to claim 25, comprising a packet multiplexer integrated within said packet processor that enables generation of an asserted packet valid signal when said packet multiplexer generates said valid output data after said packet multiplexer receives said asserted expander valid signal.

27. The system according to claim 15, wherein said packet processor is configured to generate said output data on a valid field boundary using valid data from said data expander.

28. The system according to claim 27, wherein said configuring occurs via a soft reset of at least a portion of said packet processor.

* * * * *